(12) United States Patent
Takeguchi et al.

(10) Patent No.: US 8,243,450 B2
(45) Date of Patent: Aug. 14, 2012

(54) ELECTRONIC APPARATUS

(75) Inventors: Koichiro Takeguchi, Hachioji (JP); Yasuyuki Horii, Ome (JP); Shingo Koide, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 28 days.

(21) Appl. No.: 13/009,640

(22) Filed: Jan. 19, 2011

(65) Prior Publication Data

US 2011/0249403 A1 Oct. 13, 2011

(30) Foreign Application Priority Data

Apr. 9, 2010 (JP) ................................ 2010-090889

(51) Int. Cl.
*H05K 7/20* (2006.01)
(52) U.S. Cl. ... 361/700; 361/719; 361/704; 361/679.47; 361/679.52; 174/15.2; 174/16.3
(58) Field of Classification Search .................. 361/719, 361/700–702, 704, 696, 697, 697.47, 697.52, 361/730, 752, 679.54, 748, 760, 720; 174/15.2, 174/16.3
See application file for complete search history.

(56) References Cited

U.S. PATENT DOCUMENTS

| | | | | |
|---|---|---|---|---|
| 6,535,386 B2* | 3/2003 | Sathe et al. | ................... | 361/700 |
| 7,170,165 B2 | 1/2007 | Berto et al. | | |
| 7,170,750 B2 | 1/2007 | Tanaka | | |
| 7,535,712 B2* | 5/2009 | Tanaka | ........................ | 361/700 |
| 7,570,049 B2* | 8/2009 | Lange | ........................ | 324/307 |
| 7,639,503 B2 | 12/2009 | Tanaka | | |
| 7,674,985 B2 | 3/2010 | Kaji | | |
| 7,782,622 B1* | 8/2010 | Sun et al. | ...................... | 361/719 |
| 7,952,877 B2* | 5/2011 | Okutsu | ........................ | 361/700 |
| 2006/0077637 A1* | 4/2006 | Ishikawa | ........................ | 361/703 |
| 2008/0239667 A1 | 10/2008 | Tanaka | | |
| 2008/0296047 A1 | 12/2008 | Kaji | | |
| 2010/0002388 A1 | 1/2010 | Tanaka | | |

FOREIGN PATENT DOCUMENTS

| | | |
|---|---|---|
| JP | 08-037348 | 2/1996 |
| JP | H08-228059 | 9/1996 |
| JP | 2005-166715 | 6/2005 |
| JP | 2006-216944 | 8/2006 |
| JP | 2007-299920 | 11/2007 |
| JP | 2008-251687 | 10/2008 |
| JP | 2008-294348 | 12/2008 |

OTHER PUBLICATIONS

Notice of Reasons for Rejection mailed by the Japan Patent Office on Nov. 22, 2011 in corresponding Japanese patent app. No. 2011-222818, a divisional of JP 2010-090889, in 10 pages.
Notice of Reasons for Rejection mailed by the Japan Patent Office on Apr. 26, 2011 in the corresponding Japanese app. No. 2010-090889 in 4 pages.
Notice of Reasons for Rejection mailed by the Japen Patent Office on Sep. 6, 2011 in the corresponding Japanese app. No. 2010-090889 in 8 pages.

* cited by examiner

*Primary Examiner* — Hoa C Nguyen
(74) *Attorney, Agent, or Firm* — Knobbe, Martens, Olson & Bear, LLP

(57) ABSTRACT

According to one embodiment, an electronic apparatus includes a housing, a circuit board in the housing, a first back plate on the circuit board, a second back plate on the circuit board, and a connecting portion connecting the first back plate with the second back plate.

14 Claims, 10 Drawing Sheets

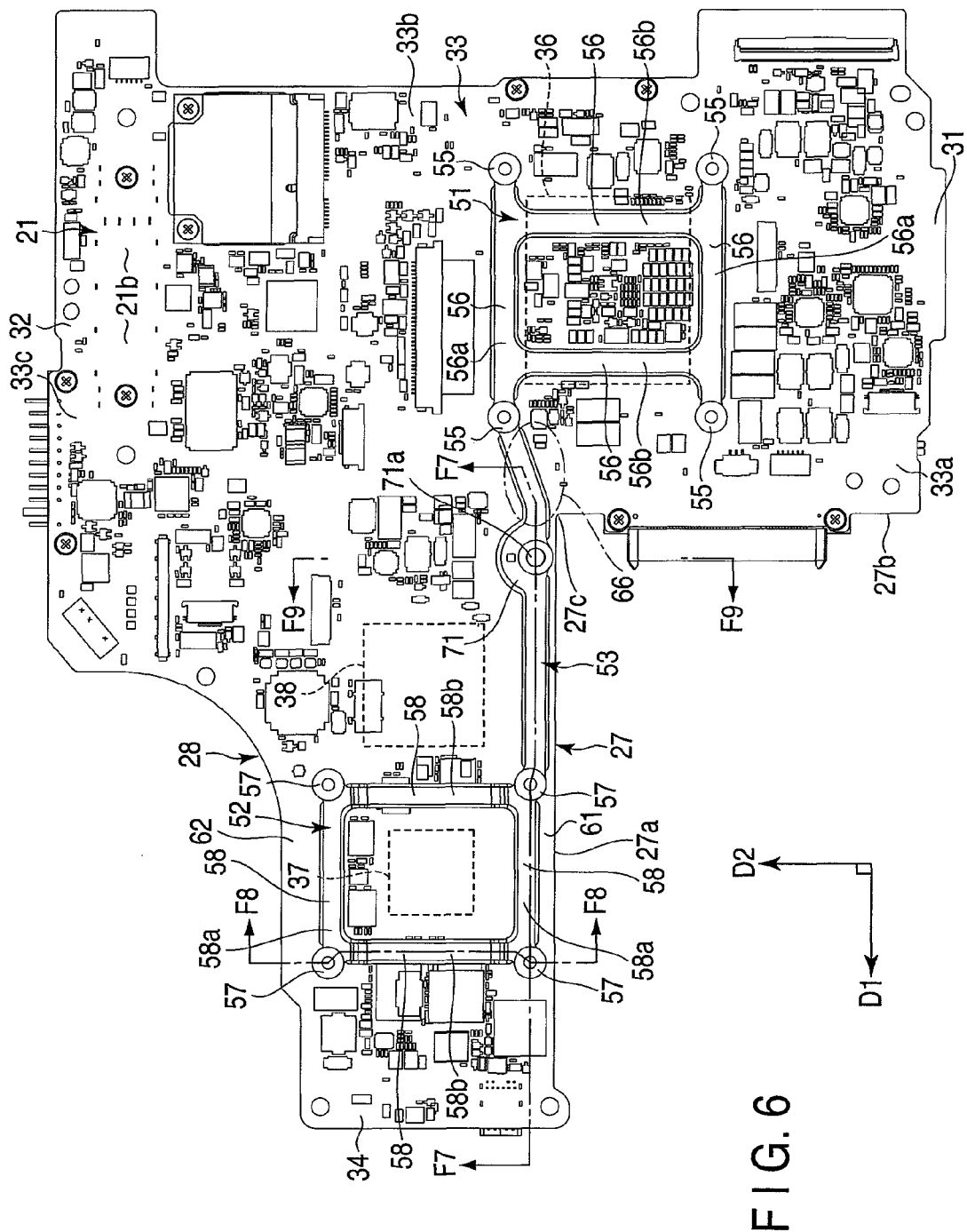
F I G. 6

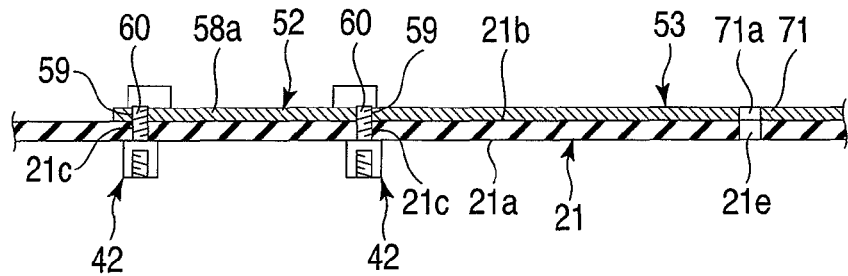
F I G. 7
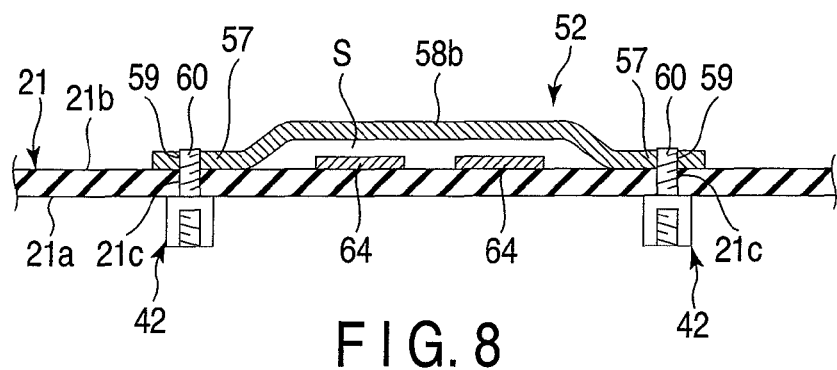
F I G. 8
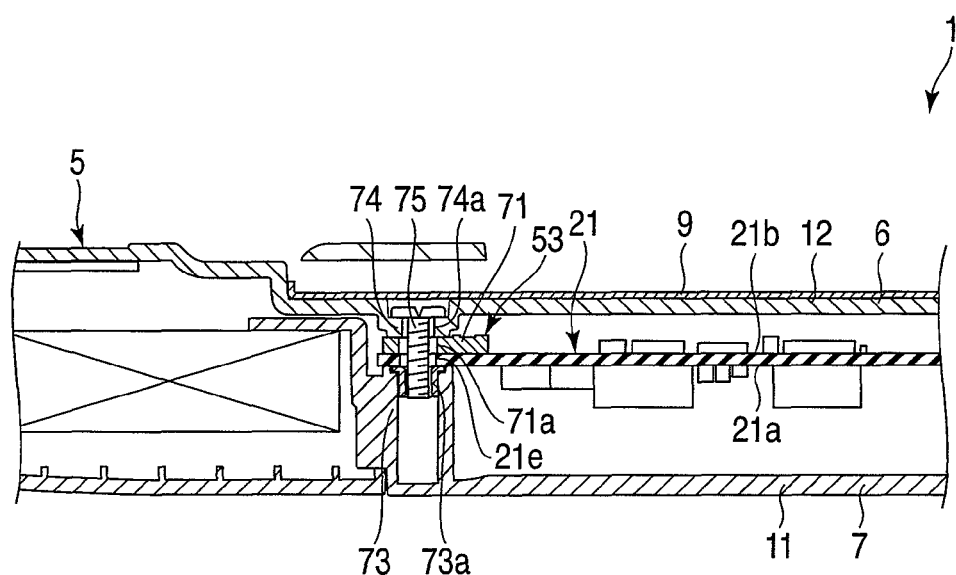
F I G. 9

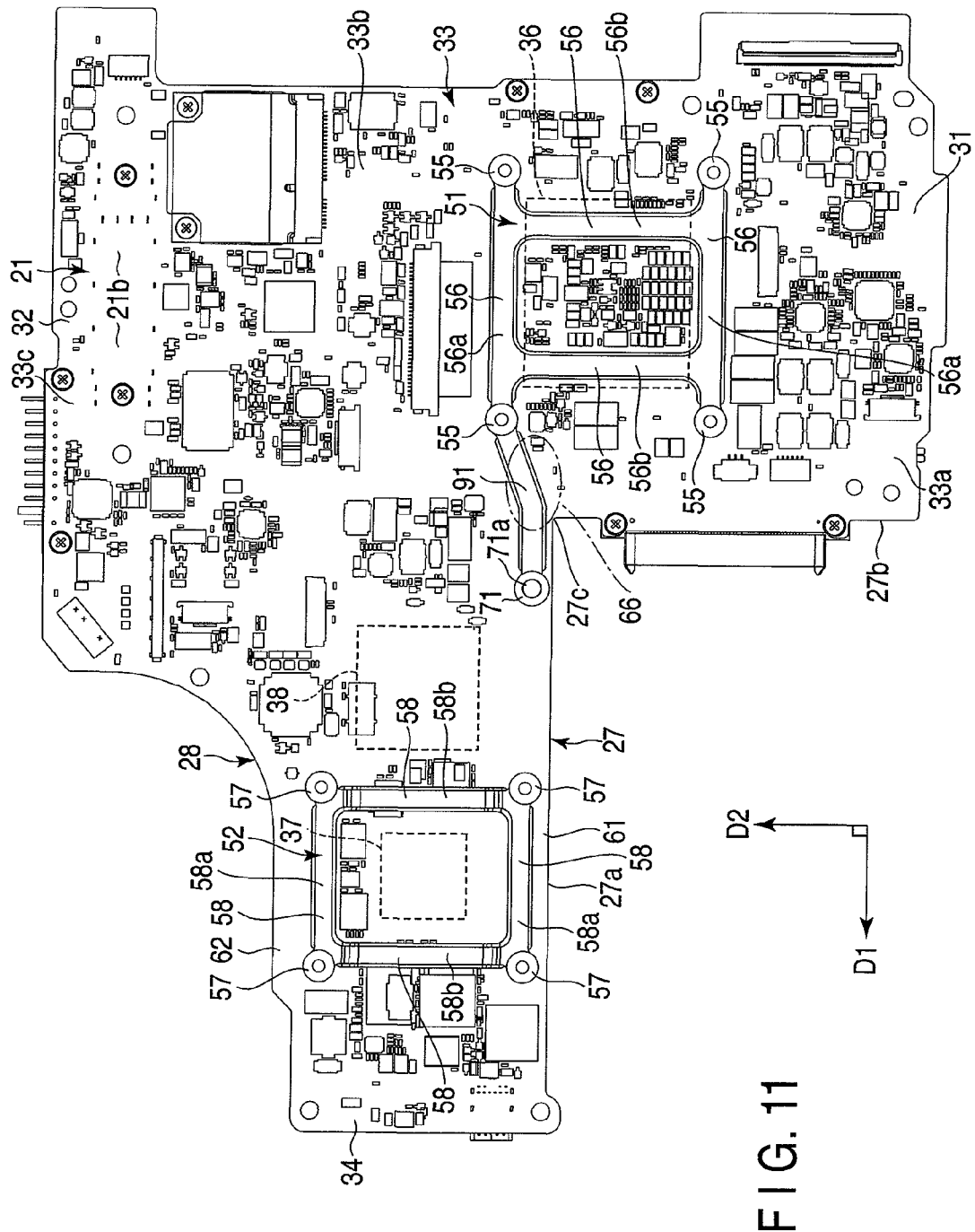
F I G. 11

ELECTRONIC APPARATUS

CROSS-REFERENCE TO RELATED APPLICATIONS

This application is based upon and claims the benefit of priority from Japanese Patent Application No. 2010-090889, filed Apr. 9, 2010; the entire contents of which are incorporated herein by reference.

FIELD

Embodiments described herein relate generally to an electronic apparatus including a circuit board.

BACKGROUND

A circuit board in an electronic apparatus occasionally includes a back plate.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 6 is an exemplary plan view illustrating the second surface of the circuit board shown in FIG. 2.

FIG. 7 is an exemplary cross-sectional view illustrating the circuit board taken along the line F7-F7 of FIG. 6.

FIG. 8 is an exemplary cross-sectional view illustrating the circuit board taken along the line F8-F8 of FIG. 6.

FIG. 9 is an exemplary cross-sectional view illustrating the circuit board taken along the line F9-F9 of FIG. 6.

FIG. 11 is an exemplary plan view illustrating a circuit board related to the first embodiment.

DETAILED DESCRIPTION

Various embodiments will be described hereinafter with reference to the accompanying drawings.

In general, according to one embodiment, an electronic apparatus comprises a housing, a circuit board in the housing, a first back plate on the circuit board, a second back plate on the circuit board, and a connecting portion connecting the first back plate with the second back plate.

Hereinafter, an exemplary embodiment applied to a notebook personal computer (hereinafter, referred to as a notebook PC) will be described with reference to the accompanying drawings.

FIGS. 1 to 9 show an electronic apparatus 1 according to a first embodiment. The electronic apparatus 1 is, for example, a notebook PC. However, electronic apparatuses to which the embodiment can be applied are not limited thereto. The embodiment can be widely applied to various kinds of electronic apparatuses including a display apparatus, such as a television, a recording and reproducing apparatus, a personal digital assistant (PDA), and a game machine.

Figure 1:
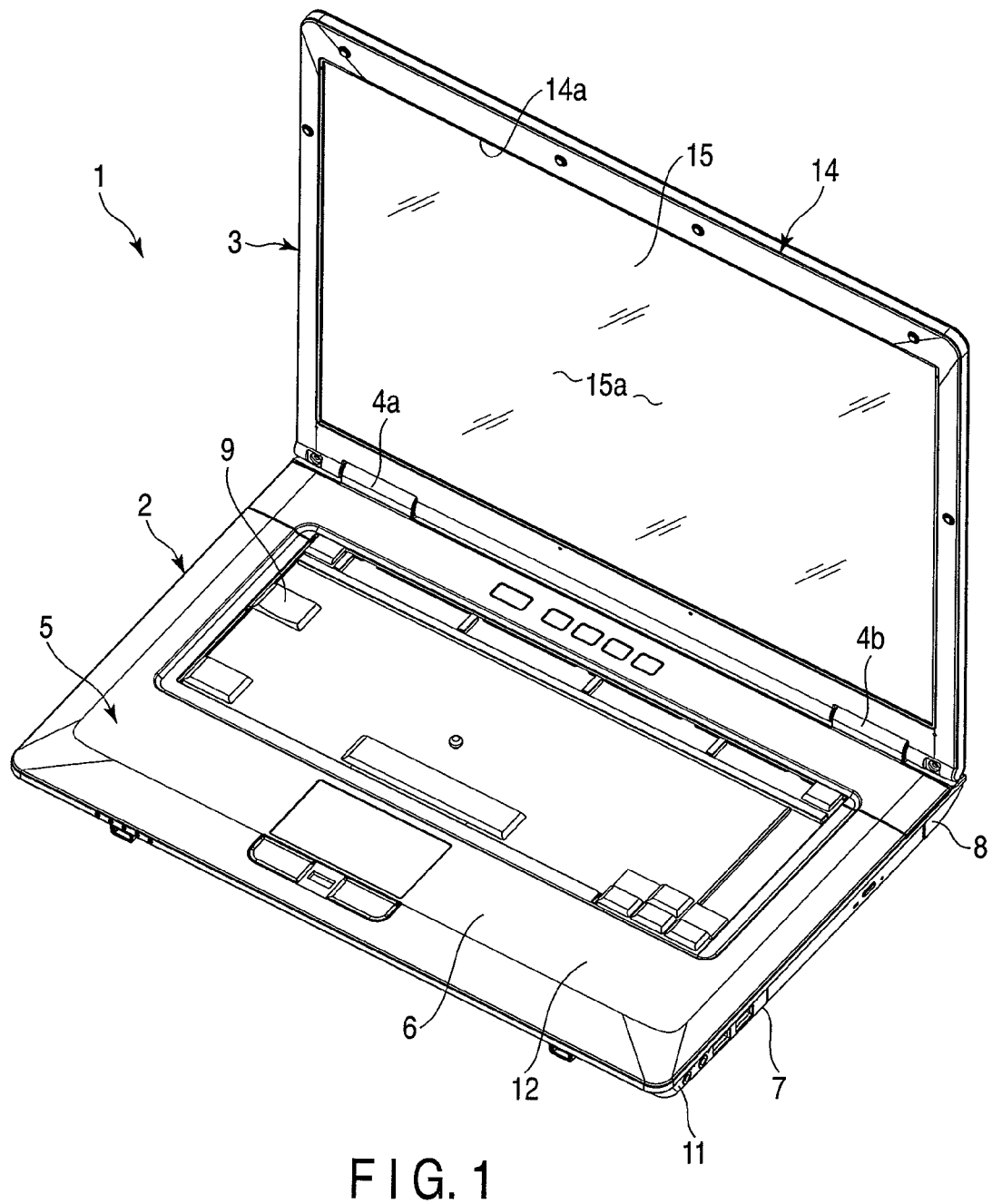
FIG. 1 is an exemplary perspective view illustrating an electronic apparatus according to a first embodiment.

As shown in FIG. 1, the electronic apparatus 1 includes a main unit 2, a display unit 3, and hinges 4a and 4b. The main unit 2 is an electronic apparatus main body provided with a main board. The main unit 2 includes a housing 5. The housing 5 has a flat box shape including an upper wall 6, a lower wall 7, and a circumferential wall 8.

The lower wall 7 faces a desk surface when the electronic apparatus 1 is placed on a desk. The lower wall 7 is substantially parallel to the desk surface. The upper wall 6 is opposite to the lower wall 7 with a space therebetween and extends substantially in parallel (that is, substantially in a horizontal direction) to the lower wall 7. A keyboard 9 is provided on the upper wall 6. Only some keys of the keyboard 9 are shown in FIG. 1. The circumferential wall 8 rises with respect to the lower wall 7, and connects the edge of the lower wall 7 and the edge of the upper wall 6.

The housing 5 includes a base 11 and a cover 12. The base 11 includes the lower wall 7 and a part of the circumferential wall 8. The cover 12 includes the upper wall 6 and a part of the circumferential wall 8. The cover 12 is combined with base 11 to form the housing 5.

The display unit 3 is rotatably (openably) connected to the rear end portion of the main unit 2 by the hinges 4a and 4b. The display unit 3 can be pivoted between a closed position where the display unit 3 falls and covers the main unit 2 from the upper side and an opened position where the display unit 3 rises with respect to the main unit 2.

As shown in FIG. 1, the display unit 3 includes a display housing 14 and a display device 15 in the display housing 14. A display screen 15a of the display device 15 is exposed to the outside through an opening portion 14a of the front wall of the display housing 14.

Figure 2:
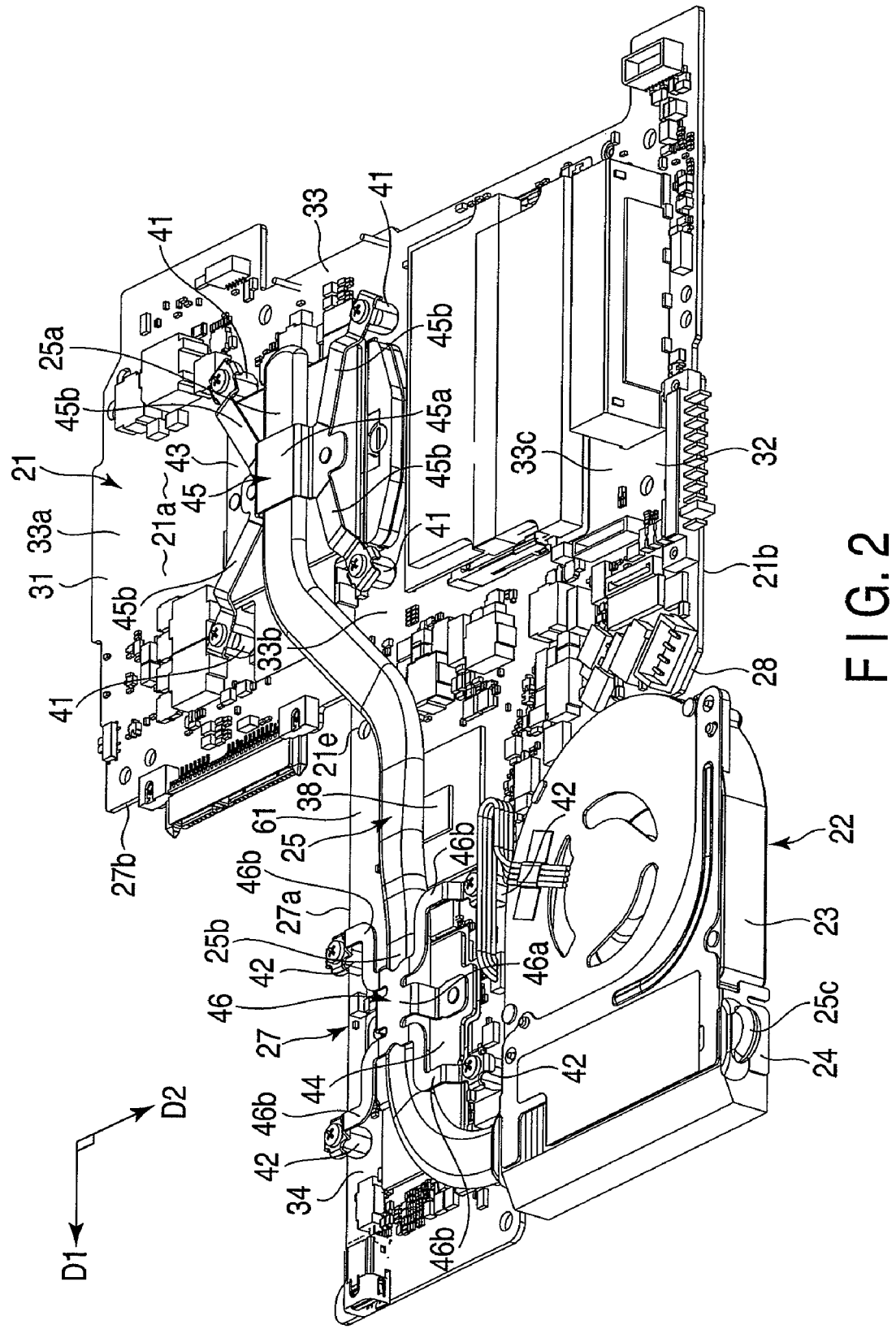
FIG. 2 is an exemplary perspective view illustrating a first surface of a circuit board according to the first embodiment.

As shown in FIG. 2, a circuit board 21 and a heat radiating module 22 are contained in the housing 5 of the main unit 2. The heat radiating module 22 is of an RHE type including a cooling fan 23, a heat sink 24, and a heat pipe 25.

The circuit board 21 is, for example, a main board. The circuit board 21 includes a first surface 21a and a second surface 21b opposite to the first surface 21a. In this embodiment, the first surface 21a is the lower surface and the second surface 21b is the upper surface. Alternatively, the first surface 21a may be the upper surface and the second surface 21b may be the lower surface.

Figure 3:
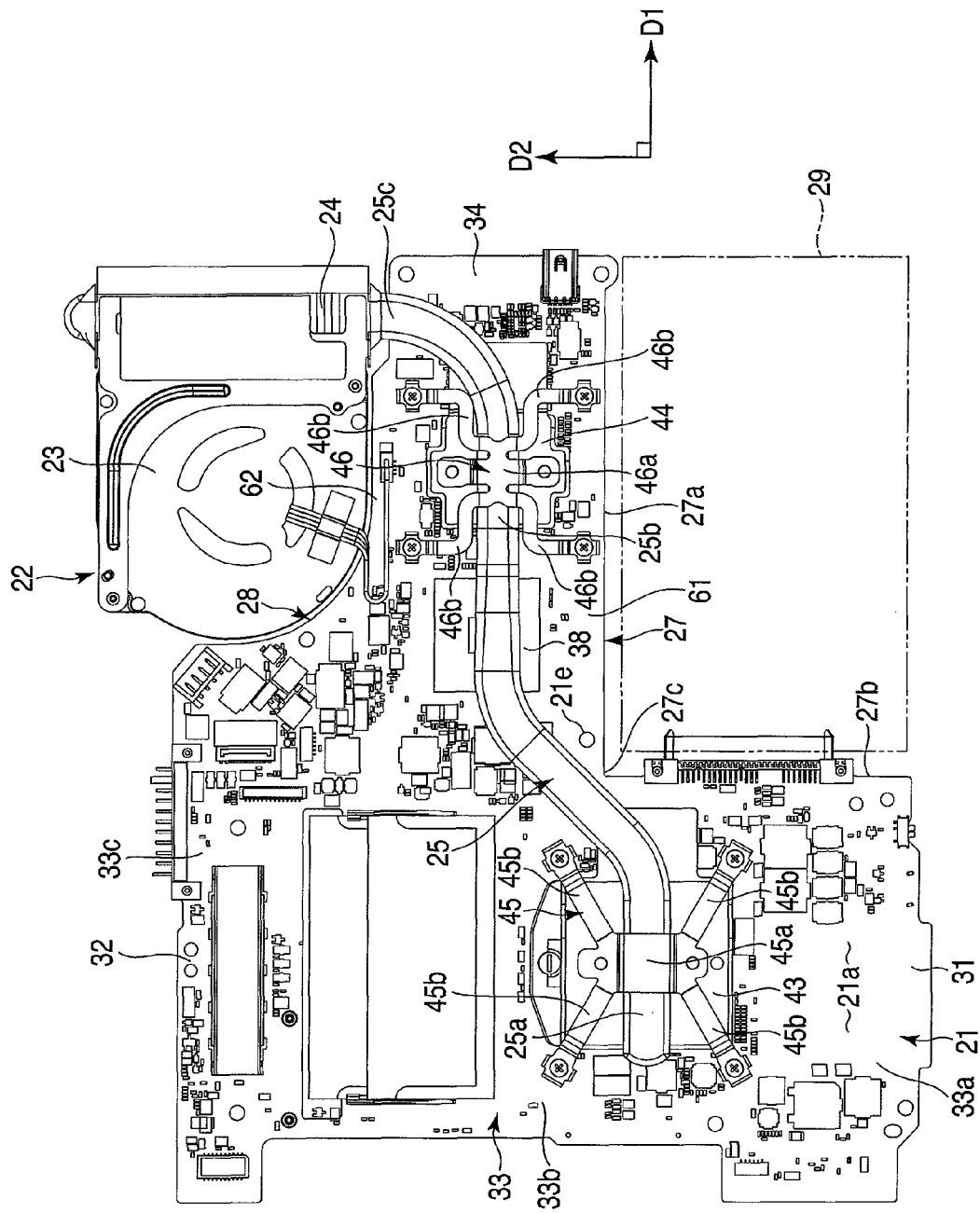
FIG. 3 is an exemplary plan view illustrating the first surface of the circuit board shown in FIG. 2.

As shown in FIG. 3, the circuit board 21 includes a first cut-out portion 27 and a second cut-out portion 28. The first cut-out portion 27 is cut out in a rectangular shape along the outward shape of a storage device 29. An example of the storage device 29 is a hard disk drive (HDD). The second cut-out portion 28 is cut out along the outward shape of the cooling fan 23 and the heat sink 24.

The first cut-out portion 27 includes a first straight portion 27a and a second straight portion 27b that extends in a direction of intersecting the first straight portion 27a. The second straight portion 27b extends, for example, in a direction substantially orthogonal to the first straight portion 27a. A substantially right-angled corner 27c is formed at the intersection of the first straight portion 27a and the second straight portion 27b.

The circuit board 21 includes a first end portion 31 and a second end portion 32 opposite to the first end portion 31. The first cut-out portion 27 is formed at the first end portion 31.

The second cut-out portion 28 is formed at the second end portion 32. In this way, the circuit board 21 includes a first portion 33 that deviates from a region between the first cut-out portion 27 and the second cut-out portion 28 and a second portion 34 positioned between the first cut-out portion 27 and the second cut-out portion 28. The second portion 34 is a so-called narrow portion. The width and strength of the narrow portion are less than those of the first portion 33.

As shown in FIG. 3, the first portion 33 includes a first region 33a, a second region 33b, and a third region 33c. The direction from the first portion 33 to the second portion 34 is a first direction D1, and a second direction D2 is substantially orthogonal to the first direction D1. The first region 33a is adjacent to the first cut-out portion 27 in the first direction D1. The second region 33b is adjacent to the second portion 34 in the first direction D1. The third region 33c is adjacent to the second cut-out portion 28 in the first direction D1.

The first direction D1 is, for example, the longitudinal direction of the circuit board 21. The second direction D2 is, for example, the lateral direction of the circuit board 21. The second portion 34 of the circuit board 21 extends in the first direction D1. The first cut-out portion 27 and the second cut-out portion 28 are parallel to the second direction D2.

Figure 4:
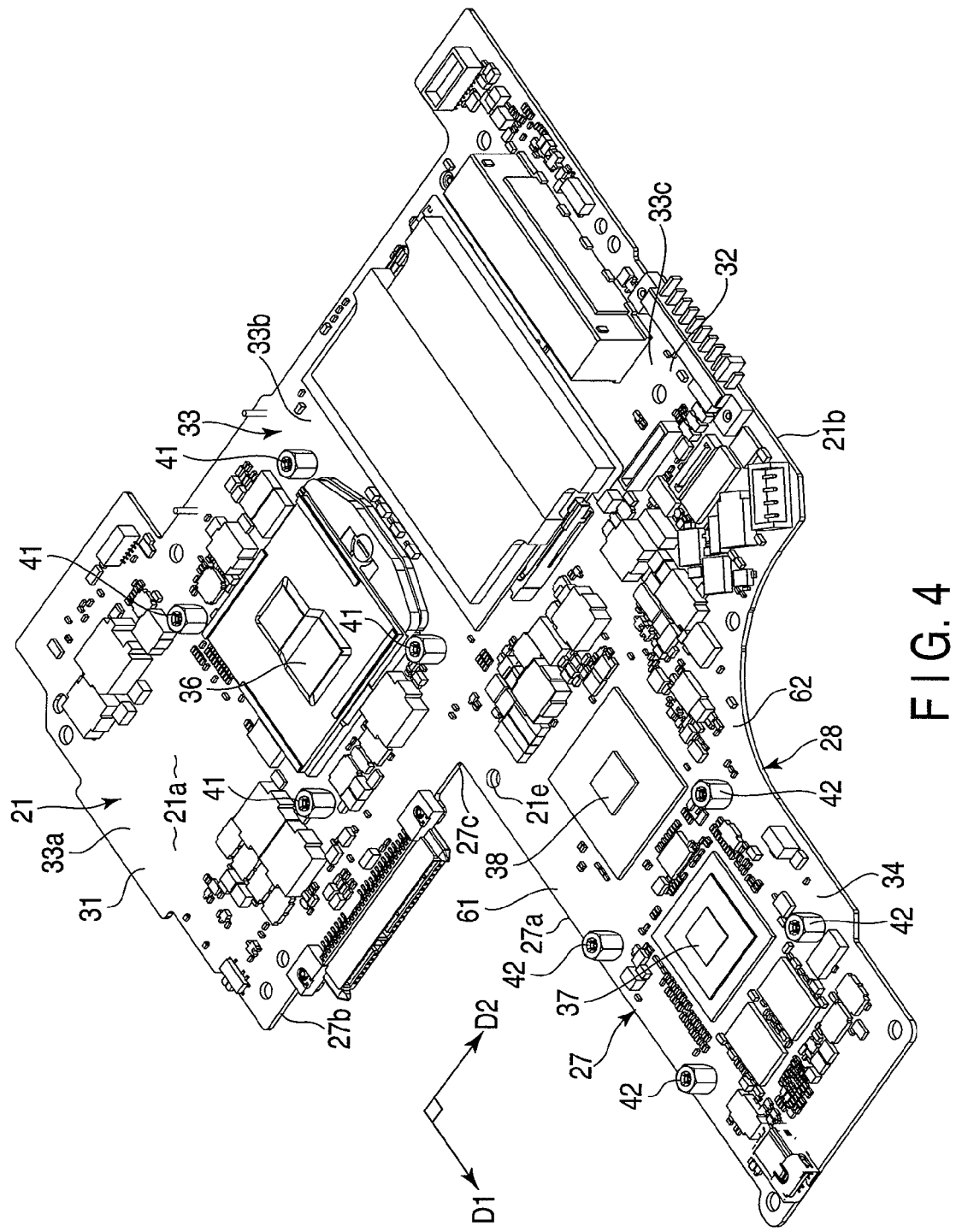
FIG. 4 is an exemplary perspective view illustrating the first surface of the circuit board shown in FIG. 2.

As shown in FIG. 4, a first heating component 36, a second heating component 37, and a third heating component 38 are provided on the first surface 21a. The first heating component 36 is, for example, a central processing unit (CPU). The second heating component 37 is, for example, a video graphics array (VGA). The third heating component 38 is, for example, a platform controller hub (PCH). The heating components to which the embodiment can be applied are not limited thereto, but heating components can be applied to various kinds of components requiring heat radiation.

The first heating component 36 is in the first portion 33 and extends from the first region 33a to the second region 33b. That is, at least a portion of the first heating component 36 is in the first region 33a. The second heating component 37 is in the second portion 34. The third heating component 38 extends from the first portion 33 to the second portion 34. That is, at least a portion of the third heating component 38 is in the second portion 34.

As shown in FIG. 4, four first studs 41 surrounding the first heating component 36 are attached to the circuit board 21. The four first studs 41 are arranged so as to correspond to four corners of the first heating component 36 with a substantially rectangular shape. Four second studs 42 surrounding the second heating component 37 are attached to the circuit board 21. The four second studs 42 are arranged so as to correspond to four corners of the second heating component 37 with a substantially rectangular shape.

As shown in FIGS. 2 and 3, a first heat receiving member 43 faces the first heating component 36 and is thermally connected thereto. A second heat receiving member 44 faces the second heating component 37 and is thermally connected thereto. The first heat receiving member 43 and the second heat receiving member 44 are heat receiving plates made of metal, for example.

The heat pipe 25 is an example of a heat transfer member and faces the first surface 21a of the circuit board 21. The heat pipe 25 includes a first heat receiving portion 25a connected to the first heat receiving member 43, a second heat receiving portion 25b connected to the second heat receiving member 44, and a heat radiating portion 25c connected to the heat sink 24. The heat pipe 25 is thermally connected to the first heating component 36, the second heating component 37, and the heat sink 24 and transfers heat generated from the first heating component 36 and the second heating component 37 to the heat sink 24. For example, the third heating component 38 is in a natural heat radiation. Alternatively, the third heating component 38 may be thermally connected to the heat pipe 25.

As shown in FIGS. 2 and 3, a first pressing member 45 is attached to the first studs 41. The first pressing member 45 includes a pressing portion 45a facing the heat pipe 25 and four fixing portions 45b that extend from the pressing portion 45a and are fixed to the first studs 41. The pressing portion 45a and the fixing portions 45b function as a leaf spring in cooperation with each other. When the fixing portions 45b are fixed to the first studs 41, the pressing portion 45a presses the heat pipe 25 and the first heat receiving member 43 against the first heating component 36. In this way, the heat pipe 25 is thermally connected to the first heating component 36 fixedly.

A second pressing member 46 is attached to the second studs 42. The second pressing member 46 includes a pressing portion 46a facing the heat pipe 25 and four fixing portions 46b that extend from the pressing portion 46a and are fixed to the second studs 42. The pressing portion 46a and the fixing portions 46b function as a leaf spring in cooperation with each other. When the fixing portions 46b are fixed to the second studs 42, the pressing portion 46a presses the heat pipe 25 and the second heat receiving member 44 against the second heating component 37. In this way, the heat pipe 25 is thermally connected to the second heating component 37 fixedly.

Figure 5:
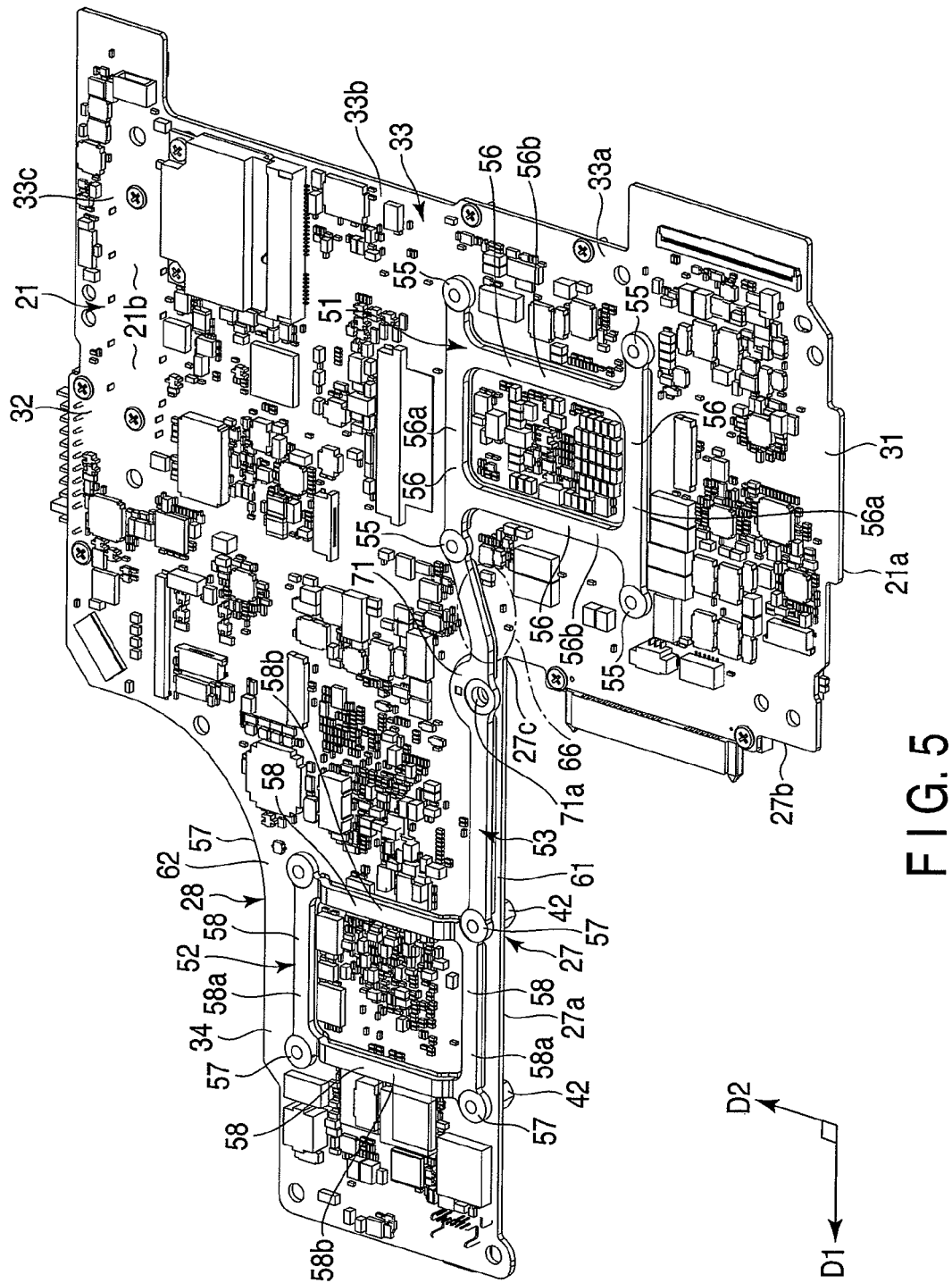
FIG. 5 is an exemplary perspective view illustrating a second surface of the circuit board shown in FIG. 2.

As shown in FIGS. 5 and 6, a first back plate 51, a second back plate 52, and a connecting portion 53 are attached to the second surface 21b of the circuit board 21. The first back plate 51, the second back plate 52, and the connecting portion 53 are integrally formed of metal, for example, and have higher rigidity than the circuit board 21.

The first back plate 51 is an example of a first reinforcing portion and corresponds to the first heating component 36. The first back plate 51 is in the first portion 33 of the circuit board 21. The first back plate 51 includes four fixing portions 55 and four beams 56 that connect the four fixing portions 55 in a frame shape. In the embodiment, the term "connection in the frame shape" is not limited to "connection in a window shape", such as the shape of the second back plate 52 shown in FIG. 5, but includes, for example, "connection in an irregular frame shape", such as the shape of the first back plate 51. That is, in the term "connection in the frame shape", the frame shape may include two beams substantially parallel to each other and two beams laid across the aforementioned two beams.

In this embodiment, the four beams 56 of the first back plate 51 include two first beams 56a extending in the first direction D1 and two second beams 56b extending in the second direction D2. The two first beams 56a extend so as to be substantially parallel to each other. The two second beams 56b are laid across the first beams 56a.

All of the four beams 56 of the first back plate 51 extend along the second surface 21b of the circuit board 21 and are substantially closely attached to the second surface 21b of the circuit board 21. The term "substantially closely attached" includes a case in which the four beams 56 overlap the surface of the circuit board with, for example, an insulator film interposed therebetween, in addition to a case in which the four beams 56 are in direct contact with the surface of the circuit board. That is, the term "substantially closely attached" means that there is substantially no gap causing bending of the circuit board between the back plate or a connecting portion, which will be described below, and the circuit board.

The fixing portions 55 are arranged at positions corresponding to the first studs 41. FIG. 8 shows an example of the second back plate 52. Similarly to the second back plate 52, the fixing portions 55 of the first back plate 51 are fixed to the circuit board 21 by the first studs 41. Specifically, the fixing portions 55 include screw holes 59. The screw hole 59 is an example of an engaging portion. The circuit board 21 includes insertion holes 21c facing the screw holes 59. The first stud 41 includes a screw portion 60. The first stud 41 is an example of a fixing member.

The screw portions 60 of the first studs 41 are inserted into the screw holes 59 of the fixing portions 55 through the insertion holes 21c of the circuit board 21. In this way, the first back plate 51 is fixed to the circuit board 21. That is, the first pressing member 45 is fixed to the first back plate 51 by the first studs 41. The first back plate 51 may be fixed by fixing members other than the studs.

The second back plate 52 is an example of a second reinforcing portion and corresponds to the second heating component 37. The second back plate 52 is in the second portion 34 of the circuit board 21. The second back plate 52 is arranged so as to face the first back plate 51 with the first cut-out portion 27 interposed therebetween. That is, the second back plate 52 is provided at a position further away from the first back plate 51 than at least a portion of the first cut-out portion 27.

The second back plate 52 includes four fixing portions 57 and four beams 58 that connect the four fixing portions 57 in a frame shape. The four beams 58 include two first beams 58a extending in the first direction D1 and two second beams 58b extending in the second direction D2. The two first beams 58a extend so as to be substantially parallel to each other. The two second beams 58b are laid across the first beams 58a.

As shown in FIGS. 5 and 7, the two first beams 58a of the second back plate 52 extend along the second surface 21b of the circuit board 21 and are substantially closely attached to the second surface 21b of the circuit board 21. As shown in FIG. 6, the circuit board 21 includes a first end portion 61 next to the first cut-out portion 27 and a second end portion 62 next to the second cut-out portion 28. The two first beams 58a are arranged so as to correspond to the first end portion 61 and the second end portion 62, respectively, and extend along the first end portion 61 and the second end portion 62.

As shown in FIGS. 5 and 8, the two second beams 58b of the second back plate 52 are separated from the circuit board 21 with a gap S between the second beams 58b and the circuit board 21. For example, a plurality of electronic components 64 is arranged in a region that overlaps the second beams 58b.

The fixing portions 57 are provided at positions corresponding to the second studs 42. As shown in FIG. 8, the fixing portions 57 are fixed to the circuit board 21 by the second studs 42. Specifically, the fixing portions 57 include screw holes 59. The screw hole 59 is an example of an engaging portion. The circuit board 21 includes the insertion holes 21c facing the screw holes 59. The second stud 42 includes a screw portion 60. The second stud 42 is an example of the fixing member.

The screw portions 60 of the second studs 42 are inserted into the screw holes 59 of the fixing portions 57 through the insertion holes 21c of the circuit board 21. In this way, the second back plate 52 is fixed to the circuit board 21. That is, the second pressing member 46 is fixed to the second back plate 52 by the second studs 42. The second back plate 52 may be fixed by fixing members other than the studs.

As shown in FIGS. 5 and 6, the connecting portion 53 extends between the first back plate 51 and the second back plate 52 and connects them. The connecting portion 53 extends between the corner (that is, the fixing portion 55) of the first back plate 51 and the corner (that is, the fixing portion 57) of the second back plate 52. The connecting portion 53 extends from the first portion 33 to the second portion 34 of the circuit board 21.

As shown in FIG. 7, the connecting portion 53 extends along the second surface 21b of the circuit board 21 and is substantially closely attached to the second surface 21b. In this embodiment, the entire connecting portion 53 is substantially closely attached to the second surface 21b of the circuit board 21.

As shown in FIGS. 5 and 6, at least a portion of the connecting portion 53 extends in a straight line along the first cut-out portion 27. Specifically, at least a portion of the connecting portion 53 extends along the outward shape of the first cut-out portion 27 (the edge of the first cut-out portion 27, that is, the first straight portion 27a). As shown in FIGS. 5 and 6, the connecting portion 53 extends on an extension of the first beam 58a of the second back plate 52. That is, the connecting portion 53 is connected to the first beam 58a in a straight line.

As shown in FIG. 6, the circuit board 21 includes a weak portion 66 weakest against bending force in the vicinity of the corner 27c of the first cut-out portion 27. When the circuit board 21 is bent, for example, stress is concentrated on the weak portion 66 and a wiring pattern is likely to be cut or a solder crack is likely to occur in the weak portion 66. The connecting portion 53 is arranged so as to pass through the weak portion 66.

As shown in FIG. 5, a fixing portion 71 is provided in the middle (intermediate portion) of the connecting portion 53. The fixing portion 71 has, for example, a substantially semi-circular shape and the width of the fixing portion 71 is more than those of the other parts of the connecting portion 53. The fixing portion 71 is provided so as to deviate from the corner 27c of the first cut-out portion 27. That is, the fixing portion 71 does not face the corner 27c of the first cut-out portion 27. The fixing portion 71 includes a first insertion hole 71a. As shown in FIG. 7, the circuit board 21 includes a second insertion hole 21e facing the first insertion hole 71a.

As shown in FIG. 9, the connecting portion 53 and the circuit board 21 are interposed between the base 11 and the cover 12 which form the housing 5. The base 11 includes a first supporting portion 73 that faces the connecting portion 53 and the circuit board 21 and supports the circuit board 21 from below, for example. The cover 12 includes a second supporting portion 74 that faces the connecting portion 53 and the circuit board 21 and supports the connecting portion 53 from above, for example.

The first supporting portion 73 includes, for example, a screw hole 73a. The screw hole 73a is an example of an engaging portion. The second supporting portion 74 includes, for example, a third insertion hole 74a. The base 11, the cover 12, the connecting portion 53, and the circuit board 21 are fixed at the same time, when a screw 75 is inserted into the screw hole 73a through the third insertion hole 74a, the first insertion hole 71a, and the second insertion hole 21e. In this way, the fixing portion 71 of the connecting portion 53 is fixed to the circuit board 21 and the housing 5. The screw 75 is an example of the fixing member.

As shown in FIG. 6, the first heating component 36 is in a region surrounded by the four fixing portions 55 of the first back plate 51 and is reinforced by the first back plate 51. The second heating component 37 is in a region surrounded by the four fixing portions 57 of the second back plate 52 and is reinforced by the second back plate 52.

A portion of the third heating component 38 is in a right-angled triangular region surrounded by two of the four fixing portions 57 of the second back plate 52 and the fixing portion 71 of the connecting portion 53. The third heating component 38 is along the second beam 58b of the second back plate 52 and the connecting portion 53. In this way, the third heating component 38 is reinforced by the second back plate 52 and the connecting portion 53. The entire third heating component 38 may be in the region surrounded by two fixing portions 57 of the second back plate 52 and the fixing portion 71 of the connecting portion 53.

According to the electronic apparatus 1 having the above-mentioned structure, it is possible to reduce stress applied to the circuit board 21. When the thickness and size of the electronic apparatus 1 are reduced, in some cases, the circuit board 21 has a complicated shape (for example, a cut-out shape). The circuit board 21 with a complicated shape is likely to be bent and receive a large amount of stress. When a heat radiating module is provided on the circuit board, the weight of the circuit board increases. For example, when the circuit board is held by the hand, the circuit board is bent due to its weight and stress is applied to the circuit board.

Figure 10:
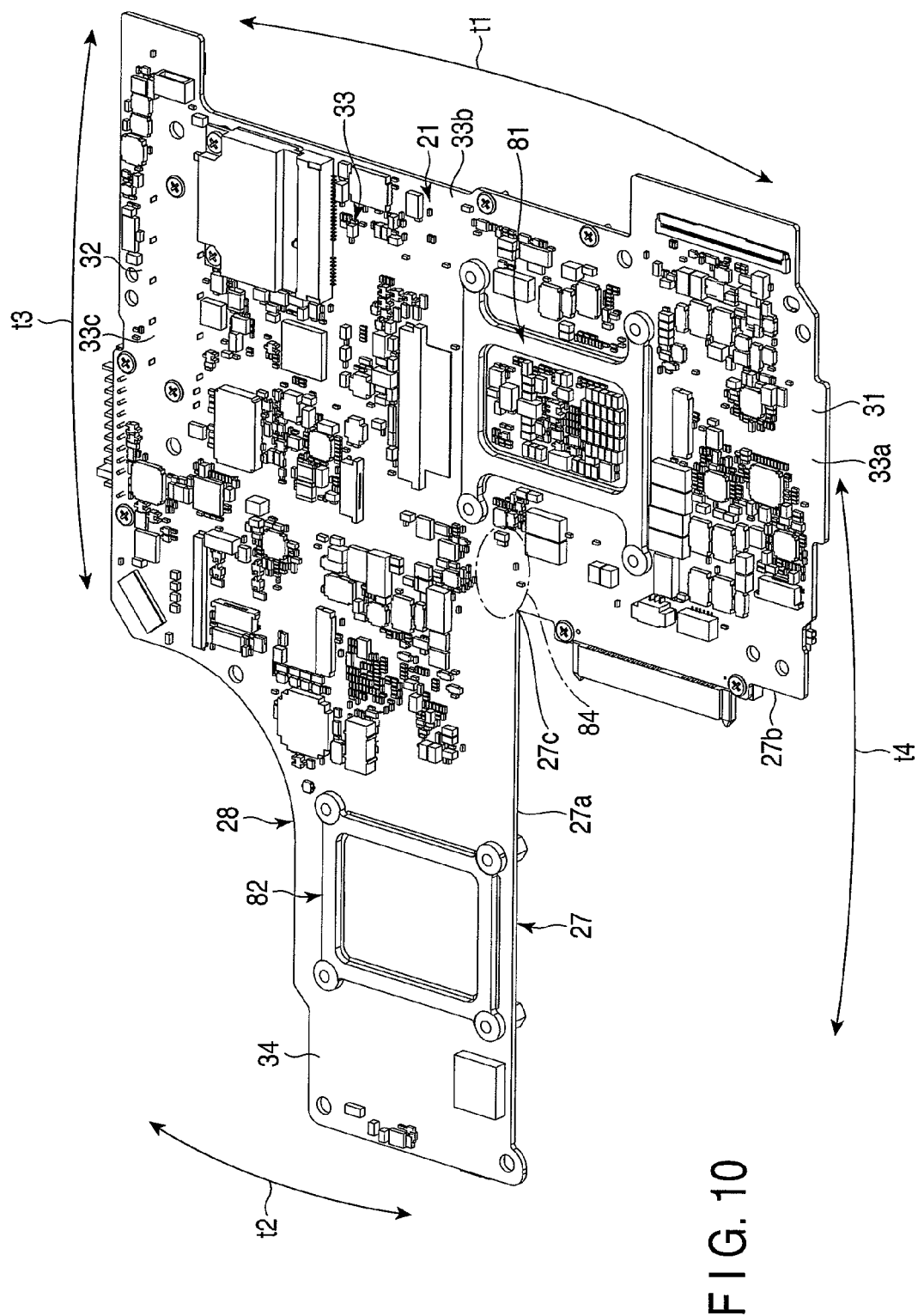
FIG. 10 is an exemplary perspective view illustrating a circuit board related to the first embodiment.

FIG. 10 shows the circuit board 21 on which a first back plate 81 and a second back plate 82 are mounted independently of each other. In the circuit board 21, the greatest bending stress is applied to a portion 84 in the vicinity of the corner 27c of the first cut-out portion 27 when the circuit board 21 is twisted around the portion 84 in the directions t1 and t2 and when the circuit board 21 is twisted around the portion 84 in the directions t3 and t4. The bending stress causes the cutting of the wiring pattern of the board through stress applied to the wiring pattern of the board. The stress is likely to cause a solder crack through stress applied to a soldering portion for a mounting component around the portion 84. The very small amount of stress is likely to reduce the long-term reliability of a product.

The circuit board 21 according to this embodiment includes the connecting portion 53 connecting the first back plate 51 with the second back plate 52. In this way, the strength of the first back plate 51 and the strength of the second back plate 52 are improved, and the circuit board 21 is reinforced by the connecting portion 53 between the first back plate 51 and the second back plate 52. Therefore, the circuit board 21 is less likely to be bent.

Therefore, even though force is applied to bend the circuit board 21, the circuit board 21 is less likely to be twisted (bent), and the stress applied to the circuit board 21 is reduced. In this way, the cutting of the wiring pattern of the circuit board 21 or a solder crack is diminished. Therefore, it is possible to improve the reliability of a product.

When the connecting portion 53 extends along the cut-out portion 27, the connecting portion 53 directly (or in the closed area) reinforces the weak portion 66 around the cut-out portion 27. Therefore, the circuit board 21 is less likely to be bent. When the connecting portion 53 extends along the cut-out portion 27, it is easy to ensure a mounting area in the central region of the circuit board 21 and it is possible to mount components at high density. When the connecting portion 53 extends along the surface of the circuit board 21, there is no gap causing the bending of the circuit board 21 between the connecting portion 53 and the circuit board 21. Therefore, the circuit board 21 is less likely to be bent.

When the connecting portion 53 includes the fixing portion 71 fixed to the circuit board 21, the integration between the connecting portion 53 and the circuit board 21 is further improved. Therefore, the circuit board 21 is less likely to deviate from the connecting portion 53 and the circuit board 21 is less likely to be bent. When the fixing portion 71 is fixed to the housing 5, the circuit board 21 is also supported by the housing 5. Therefore, the circuit board 21 is less likely to be bent.

As described above, stress is likely to be concentrated on the corner 27c of the cut-out portion 27 and the periphery of the corner 27c is likely to be weak against stress. When the insertion hole 71a of the fixing portion 71 is close to the corner 27c of the cut-out portion 27, the periphery of the corner 27c is likely to be weaker against stress. However, in this embodiment, the fixing portion 71 is provided so as to deviate from the corner 27c of the cut-out portion 27. Therefore, the fixing portion 71 can fix the connecting portion 53 to the circuit board 21 while maintaining the strength of the circuit board 21.

When the third heating component 38 is along the connecting portion 53, the periphery of the third heating component 38 is reinforced by the connecting portion 53. That is, the bending of the circuit board 21 in the vicinity of the third heating component 38 is reduced, so is the stress applied to the third heating component 38.

In this embodiment, a portion of the third heating component 38 is in the region surrounded by two fixing portions 57 of the second back plate 52 and the fixing portion 71 of the connecting portion 53. Therefore, the bending of the circuit board 21 in the vicinity of the third heating component 38 is further reduced, so is the stress applied to the third heating component 38.

The second back plate 52 includes two first beams 58a along the surface of the circuit board 21 and two second beams 58b having the space between the circuit board 21. The strength of the second back plate 52 in the bending direction is more than that of the back plate in which all of four beams are closely attached to the circuit board. Since a portion (second beams 58b) of the second back plate 52 has the space between the surface of the circuit board and the second back plate 52, it is possible to mount components in a portion that overlaps the second back plate 52. In this way, it is possible to mount components at high density.

However, when there is a gap between all of the beams of the back plate and the circuit board 21, the amount of bending of the circuit board 21 is likely to increase by a value corresponding to the gap. Therefore, in the second back plate 52 according to this embodiment, two first beams 58a extending in the direction (longitudinal direction) in which the circuit board 21 is more likely to be bent are closely attached to the circuit board 21, and two second beams 58b extending in the direction (lateral direction) in which the circuit board 21 is less likely to be bent are separated from the circuit board 21. In this way, it is possible to simultaneously achieve the securement of a mounting area and the reinforcement of the circuit board 21 with a good balance.

When the connecting portion 53 extends substantially on the extension of the first beam 58a of the second back plate 52, a straight beam extending from the second back plate 52 to the connecting portion 53 is formed. Therefore, the circuit board 21 is less likely to be bent.

When the first pressing member 45 fixed to the first back plate 51 and pressing the heat pipe 25, and the second pressing member 46 fixed to the second back plate 52 and pressing the heat pipe 25 are provided, the first pressing member 45 and the second pressing member 46 apply bending force to the circuit board 21 through the heat pipe 25. In the circuit board 21 having the above-mentioned structure, when the connecting portion 53 connects the first back plate 51 and the second back plate 52, a beam against the bending force is formed so as to extend from the first heating component 36 to the second heating component 37. Therefore, the circuit board 21 is less likely to be bent.

Next, two modifications of the electronic apparatus 1 will be described with reference to FIGS. 11 and 12. Components having the same or similar functions as those of the above-described embodiment are denoted by the same reference numerals and a description thereof will be omitted. The modifications are similar to the above-described embodiment except for the following structure.

FIG. 11 shows a circuit board 21 of an electronic apparatus 1 according to a first modification. As shown in FIG. 11, a first back plate 51 includes, for example, an extending portion 91 that extends from a fixing portion 55 to a side opposite to a first beam 56. A fixing portion 71 is at the leading end portion of the extending portion 91. At least a portion of a third heating component 38 is in a region surrounded by two fixing portions 57 of a second back plate 52 and the fixing portion 71 of the extending portion 91. In this way, the third heating component 38 is reinforced similar to the above-described embodiment.

Figure 12:
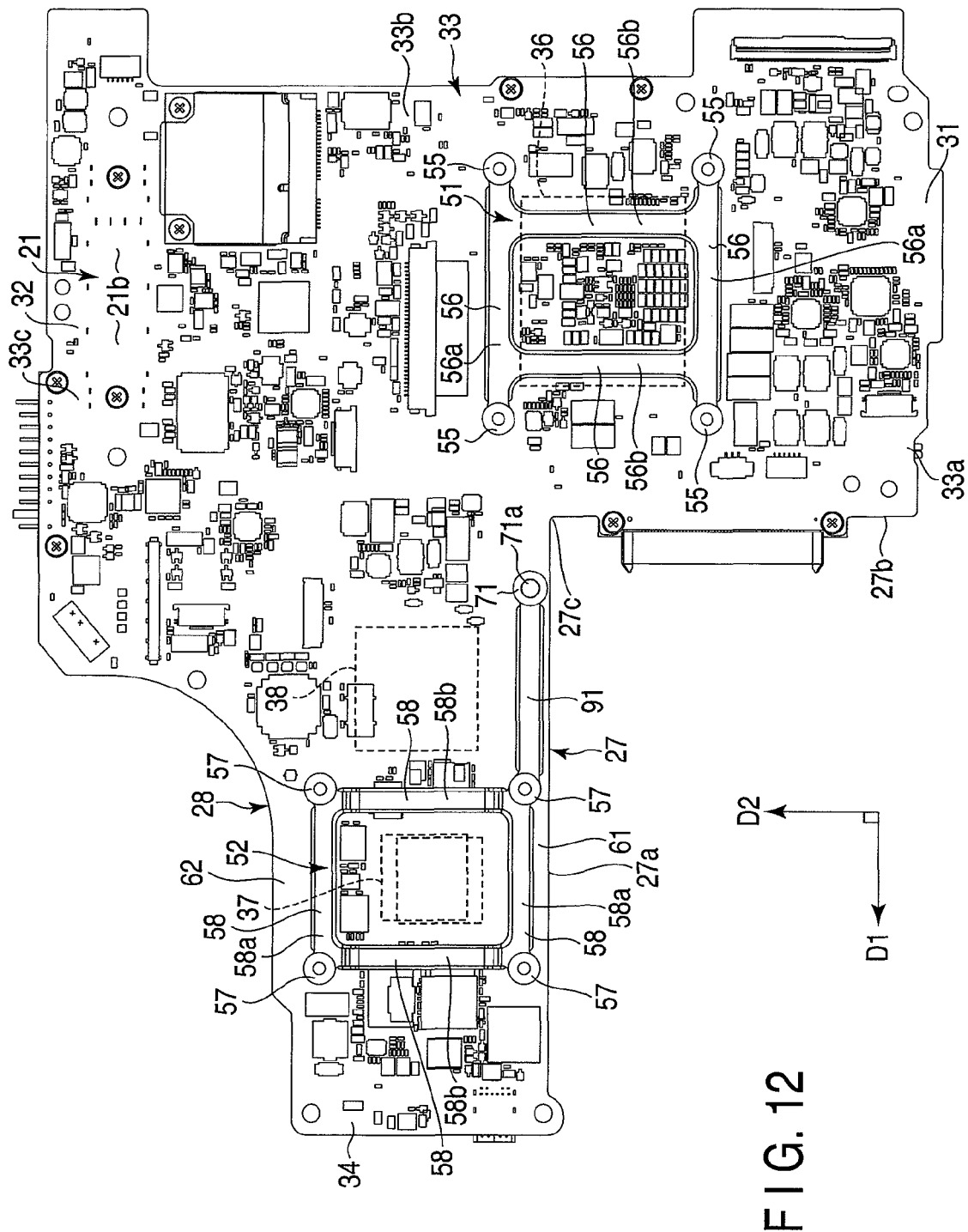
FIG. 12 is an exemplary plan view illustrating a circuit board related to the first embodiment.

FIG. 12 shows a circuit board 21 of an electronic apparatus 1 according to a second modification. As shown in FIG. 12, a second back plate 52 includes, for example, an extending portion 91 that extends from a fixing portion 57 to a side opposite to a first beam 58. The extending portion 91 extends along a third heating component 38. A fixing portion 71 is provided at the leading end portion of the extending portion 91. At least a portion of the third heating component 38 is in a region surrounded by two second fixing portions 57 of a second back plate 52 and the fixing portion 71 of the extending portion 91. In this way, the third heating component 38 is reinforced similar to the above-described embodiment.

The electronic apparatus 1 according to an embodiment has been described above, but the embodiment is not limited thereto. The invention is not limited to the above-described embodiment, but the components may be changed without departing from the scope and spirit of the invention.

The connecting portion 53 is not necessarily arranged along the cut-out portion of the circuit board 21. The fixing portion 71 of the connecting portion 53 may be fixed only to the housing 5 or the circuit board 21. The fixing portion 71 of the connecting portion 53 may be appropriately omitted. The heat radiating module 22 is not an indispensable component, but may be appropriately omitted. The second beams 58b of the second back plate 52 may be substantially closely attached to the circuit board 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a housing;
   a circuit board in the housing comprising a cut-out portion;
   a first back plate on the circuit board;
   a second back plate on the circuit board, the second back plate located further away from the first back plate than at least a portion of the cut-out portion; and
   a connecting portion configured to connect the first back plate and the second back plate, wherein at least a portion of the connecting portion is located along at least a portion of the cut-out portion.

2. The electronic apparatus of claim 1,
   wherein the connecting portion is located along a surface of the circuit board.

3. The electronic apparatus of claim 1,
   wherein the connecting portion comprises a fixing portion configured to be fixed to the circuit board.

4. The electronic apparatus of claim 3,
   wherein the fixing portion is configured to be fixed to the housing.

5. The electronic apparatus of claim 4,
   wherein the fixing portion is positioned away from a corner of the cut-out portion.

6. The electronic apparatus of claim 5, further comprising:
   a heating component on the circuit board, the heating component located along the connecting portion.

7. The electronic apparatus of claim 6,
   wherein the second back plate comprises four fixing portions configured to be fixed to the circuit board, and
   at least a portion of the heating component is in a region surrounded by two of the four fixing portions of the second back plate and the fixing portion of the connecting portion.

8. The electronic apparatus of claim 7,
   wherein the second back plate comprises four beams configured to connect the four fixing portions in a frame shape, and
   the four beams comprising two first beams along a surface of the circuit board and two second beams comprising a space between the circuit board and the second beams.

9. The electronic apparatus of claim 8,
   wherein the first beams extend in a longitudinal direction of the circuit board and the second beams extend in a lateral direction of the circuit board.

10. The electronic apparatus of claim 8,
    wherein the two first beams are at both end portions of the circuit board, respectively, and are located along the both end portions.

11. The electronic apparatus of claim 9,
    wherein the connecting portion is located substantially on an extension of one of the first beams.

12. The electronic apparatus of claim 1, further comprising:
    a heat pipe facing the circuit board;
    a first pressing member attached to the first back plate and configured to press the heat pipe; and
    a second pressing member attached to the second back plate and configured to press the heat pipe.

13. An electronic apparatus comprising:
    a housing;
    a circuit board in the housing;
    a first back plate on the circuit board;
    a second back plate on the circuit board; and
    a connecting portion configured to connect the first back plate with the second back plate, wherein a portion of the connecting portion is located along at least a part of an end portion of the circuit board.

14. An electronic apparatus comprising:
    a housing;
    a circuit board in the housing comprising a first heating component and a second heating component;
    a first reinforcing portion configured to attach to the circuit board and corresponding to the first heating component;
    a second reinforcing portion configured to attach to the circuit board and corresponding to the second heating component; and
    a connecting portion configured to connect the first reinforcing portion with the second reinforcing portion, wherein a portion of the connecting portion is located along at least a part of an end portion of the circuit board.

* * * * *